May 22, 1928.
C. C. FARMER ET AL
1,671,089
FLUID PRESSURE BRAKE
Original Filed Jan. 6, 1926
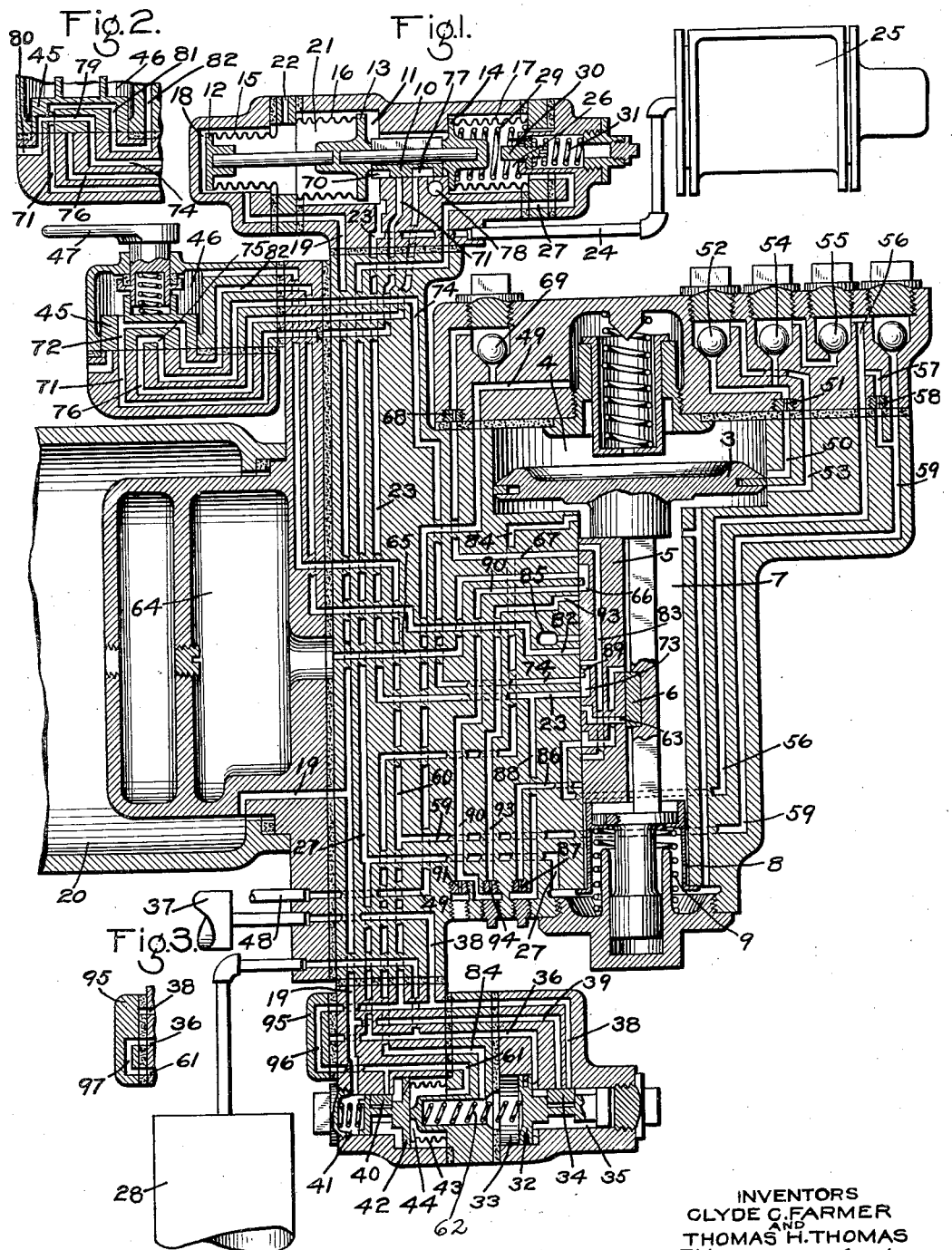
INVENTORS
CLYDE C. FARMER
AND
THOMAS H. THOMAS
BY *Wm. M. Cady*
ATTORNEY Patented May 22, 1928.

1,671,089

UNITED STATES PATENT OFFICE.

CLYDE C. FARMER, OF PITTSBURGH, AND THOMAS H. THOMAS, OF EDGEWOOD, PENNSYLVANIA, ASSIGNORS TO THE WESTINGHOUSE AIR BRAKE COMPANY, OF WILMERDING, PENNSYLVANIA, A CORPORATION OF PENNSYLVANIA.

FLUID-PRESSURE BRAKE.    REISSUED

Application filed January 6, 1926, Serial No. 79,542. Renewed November 9, 1927.

This invention relates to fluid pressure brakes, and more particularly to a valve device for controlling and maintaining the pressure in the brake cylinder.

One object of our invention is to provide means for maintaining the pressure in the brake cylinder and for controlling the graduated release of the brakes, in which the maintaining means are controlled by variations in auxiliary reservoir pressure, so that release of fluid from the brake cylinder in graduating the release of the brakes will be more nearly proportional to the rate of increase in auxiliary reservoir pressure.

Another object is to prevent the brake cylinder pressure maintaining means from functioning when the apparatus is set for direct release, except upon movement of the triple valve device to application position.

Other objects and advantages will appear in the following more detailed description of the invention.

In the accompanying drawing; Fig. 1 is a diagrammatic sectional view of a brake cylinder pressure controlling and maintaining valve device embodying our invention; Fig. 2 a view of the graduated release controlling portion set at the direct release position; and Fig. 3 a view of the change-over cap in position for supplying auxiliary reservoir pressure instead of maintaining reservoir pressure to the emergency reservoir charging device.

According to our invention, the apparatus may comprise a triple valve portion, a brake cylinder pressure maintaining and control portion, a check valve portion, and a graduated release control portion.

The triple valve portion comprises a piston 3 contained in piston chamber 4, a main slide valve 5 and a graduating slide valve 6 contained in valve chamber 7 and adapted to be operated by piston 3. The triple valve device is provided with means for securing a retarded release of the brakes including a yielding stop member 8 adapted to engage the slide valve 5 and subject to the pressure of a coil spring 9.

The brake cylinder pressure maintaining and control portion comprises a slide valve 10 contained in valve chamber 11 and adapted to be operated by variations in fluid under pressure on diaphragm heads 12, 13, and 14 having leak tight connections to flexible bellows diaphragms 15, 16, and 17. The chamber 18 at the left of diaphragm head 12 is connected through passage 19 with an emergency reservoir 20. The chamber 21 inclosed by the diaphragms 15 and 16 is open to the atmosphere through an exhaust port 22. The valve chamber 11 is connected through passage 23 and pipe 24 to the brake cylinder 25 and chamber 26 at the right of diaphragm head 17 is connected through passage 27 with valve chamber 7 and the auxiliary reservoir 28.

A coil spring 29 acts on the diaphragm head 14 and tends to move same to the left and upon a predetermined movement of said head toward the right, a stop member 30 is engaged, the movement of which is opposed by a spring 31.

The check valve portion comprises a piston 32 contained in a piston chamber 33 and a slide valve 34 contained in valve chamber 35 and adapted to be operated by piston 32. The auxiliary reservoir 28 is connected through passage 36 with valve chamber 35. A maintaining reservoir 37 is connected to a passage 38 leading to the seat of slide valve 34 and the emergency reservoir 20 is connected through passage 19 with a passage 39 leading to the seat of slide valve 34, so that when slide valve 34 is moved to the left, the emergency reservoir 20 and the maintaining reservoir 37 are connected to the auxiliary reservoir 28.

The check valve portion also includes a slide valve 40 contained in valve chamber 41 and adapted to be operated by a diaphragm head 42 which is connected to a flexible bellows diaphragm 43. The valve chamber 41 is connected through passage 19 with the emergency reservoir 20 and chamber 44 at the right of diaphragm head 42 is connected to passage 38 and consequently to the maintaining reservoir 37.

The graduated release control portion comprises a rotary valve 45 contained in valve chamber 46 and a handle 47 for operating said valve.

In operation, with the handle 47 of the release control portion seat for graduated release, as shown in Fig. 1, fluid supplied to the brake pipe 48, flows through passage 49 to piston chamber 4 of the triple valve device, and with piston 3 in normal full release position, fluid flows from piston chamber 4 through passage 50 and a restricted port 51 and past a ball check valve 52 to passage 53 and valve chamber 7, charging said valve chamber and the auxiliary reservoir 28, through passage 27, with fluid at the pressure carried in the brake pipe 48.

The maintaining reservoir 37 is also charged with fluid under pressure from passage 50, past ball check valves 54 and 55, passage 56, passage 57 having a restricted flow port 58, and passages 59 and 60, the passage 60 being in communication with passage 38, leading to the maintaining reservoir 37. The maintaining reservoir is connected through passage 61 with chamber 44 at the right of diaphragm head 42, so that the diaphragm head 42 will be shifted to the left, causing a port, leading to the passage 61, to be uncovered by the movement of slide valve 40. Fluid under pressure is then supplied to valve chamber 41 and through passage 19 to the emergency reservoir 20.

When the emergency reservoir 20 has been charged to substantially the pressure of the maintaining reservoir 37, the spring 62 shifts the diaphragm head 42 and slide valve 40 to the right, so as to cut off communication from the maintaining reservoir to the emergency reservoir.

If it is desired to effect a service application of the brakes, a gradual reduction in brake pipe pressure is made and thereupon the triple valve piston 3 is moved out to service position, in which port 63 in slide valve 5, which was uncovered by the preliminary movement of the graduating valve 6, registers with passage 23. Fluid under pressure is then supplied from valve chamber 7 and the auxiliary reservoir 28 to the brake cylinder 25 to effect an application of the brakes. In the movement to service position, a quick service chamber 64 is connected to the brake pipe through passage 65, cavity 66 in slide valve 5, and passage 67, having a restricted flow port 68 and containing a ball check valve 69. Fluid thus vented from the brake pipe causes a local reduction in brake pipe pressure, and the well known quick serial action throughout the train.

With the usual standard fluid pressure brake, the design and proportions are such that the first five pounds reduction in brake pipe pressure functions to operate the triple valve device so as to supply fluid under pressure to the brake cylinder sufficient to effect the movement of the brake cylinder piston to a predetermined distance, which is usually eight inches, and then for every additional pound reduction in brake pipe pressure, the brake cylinder pressure is increased three and one-quarter pounds.

The pressure maintaining portion is subject to the pressures of the brake cylinder, the auxiliary reservoir, and the constant pressure of the emergency reservoir and the diaphragm heads 12, 13, and 14 are so proportioned that for every reduction in auxiliary reservoir pressure of one pound, which corresponds with a pound reduction in brake pipe pressure, the maintaining portion operates to maintain a pressure of three and one-quarter pounds in the brake cylinder. In order to prevent the maintaining portion from raising the brake cylinder pressure in the above proportion during the first five pounds reduction in brake pipe pressure, so that the brake cylinder pressure on cars equipped with our improvement will not be higher than that on cars not so equipped, the diaphragm head 14 is subjected to the pressure of a spring 29, which is such that the first five pounds reduction in auxiliary reservoir pressure is balanced by the opposing pressure of the spring.

As the brake pipe pressure is reduced to a greater extent than five pounds, the brake cylinder pressure is increased at the rate of three and one-quarter pounds for each pound reduction in brake pipe pressure as hereinbefore explained and so long as there is no leakage from the brake cylinder or the brake cylinder piston does not exceed its normal piston travel, the maintaining portion will not act.

If, however, there is leakage from the brake cylinder, or the brake cylinder pressure is not increased at the above rate, then the balance of pressures on the maintaining portion will be destroyed and the maintaining portion will be operated by the corresponding deficiency of brake cylinder pressure acting on the diaphragm head 13, so that the slide valve 10 is moved to the right, the movement of the diaphragm head 14 to the right, first operating to compress the spring 29 and then moving to engage and move the spring stop 30 so as to compress the spring 31. The slide valve 10 is thus moved, so that the notch 70 registers with passage 71 and fluid under pressure is then supplied from the maintaining reservoir 37 to the brake cylinder 25 through passage 38, passage 60, valve chamber 46 of the release controlling valve device, port 72 in rotary valve 45, passage 71, notch 70, valve chamber 11 of the maintaining valve portion, and brake cylinder passage 23.

When the brake cylinder pressure has thus been increased by flow from the maintaining reservoir to the predetermined ratio, the increase in brake cylinder pressure acting on the diaphragm head 13, together with the pressure of the spring 31 act to shift the diaphragm heads and the slide valve 10 to the left to lap position, in which further flow of fluid to the brake cylinder is cut off.

If, after the brakes have been applied, it is desired to effect a graduated release of the brakes, a gradual increase in brake pipe pressure is made and the triple valve piston 3 is thereby shifted to normal release position. In this position, fluid is supplied from the brake pipe to the auxiliary reservoir through passage 50, past check valve 52, and passage 53 and the increase in auxiliary reservoir pressure as thus effected, acts on the diaphragm head 14 of the maintaining portion so as to shift the slide valve 10 to the left to the release position, in which the brake cylinder is connected to the exhaust, through passages 23, cavity 73 in triple slide valve 5, passage 74, cavity 75 in rotary valve 45, passage 76, cavity 77 in slide valve 10, and exhaust port 78. When the brake cylinder pressure has been reduced to correspond with the increase in auxiliary reservoir pressure, the pressures acting on the diaphragm heads will be such that the slide valve 10 will be moved to the right to lap position, thus cutting off the further exhaust of fluid from the brake cylinder. A further reduction in brake cylinder pressure may be effected in the same manner, by making a further increase in brake pipe pressure, as will be evident.

If it is desired to cut out graduated release and release the brakes directly, the handle 47 of the release control portion is operated to turn the rotary valve 45 to the position shown in Fig. 2. In this position, the passage 74 is connected through cavity 79 in rotary valve 45 with an atmospheric exhaust port 80, instead of to passage 76, so that the release of fluid from the brake cylinder is controlled directly by the triple valve device and independently of the pressure maintaining portion. With the exhaust so controlled, when the triple valve device is operated by an increase in brake pipe pressure to release the brakes, the fluid under pressure in the brake cylinder will be completely exhausted, as would be the case in any fluid pressure brake equipment not having the graduated release feature.

With direct exhaust from the brake cylinder, if the brakes are applied and there is brake cylinder leakage, so that the pressure maintaining portion operates to supply fluid from the maintaining reservoir to compensate for the loss by leakage, the pressure in the maintaining reservoir may be reduced to a degree less than the auxiliary reservoir pressure, in which case fluid would flow from the auxiliary reservoir through passage 50 and past the check valves 54 and 55 to the maintaining reservoir. This reduction in auxiliary reservoir pressure will cause the triple valve piston to move to release position, in which the brake cylinder is connected to the direct exhaust port 80. The pressure maintaining portion would then, unless prevented, continue to attempt to maintain the brake cylinder pressure, with the result that the maintaining reservoir as well as the auxiliary reservoir and the brake pipe would be vented at the exhaust port 80.

In order to obviate the above difficulty, the pressure maintaining portion is prevented from operating when the triple valve device is in release position and the release controlling device is in the direct release position. For this purpose, the passage 71 in direct release position is connected through a cavity 81, in the rotary valve 45, with a passage 82 which leads to the seat of the triple slide valve 5. In service application position of slide valve 5, the passage 82 is connected through a cavity 83 in the slide valve with passage 56, which communicates with the maintaining reservoir 37, so that in service position fluid under pressure is supplied from the maintaining reservoir to the pressure maintaining portion and consequently the maintaining portion can operate as usual. If, however, the triple valve piston should move to release position, then the passage 82 will be blanked and the pressure maintaining portion will be prevented from operating.

In the graduated release position, however, fluid under pressure is supplied from the maintaining reservoir 37 directly from the valve chamber 46, through port 72 to the passage 71, so that in graduated release position, the pressure maintaining portion can operate regardless of the position of the triple valve device.

When an emergency application of the brakes is effected, the triple valve piston 3 is moved to its extreme outer position in which a passage 84, leading to piston chamber 33 is connected through cavity 83 in slide valve 5 with an exhaust port 85. Fluid under pressure is then vented from piston chamber 33 and piston 32 is moved to the left, so that slide valve 34 is operated to uncover the passages 38 and 39, thus connecting together the emergency reservoir 20, the maintaining reservoir 37, and the auxiliary reservoir 28. The movement of slide valve 5 to emergency position also uncovers a passage 86, so that fluid under pressure from the valve chamber 7 and consequently the auxiliary reservoir 28, as well as the connected emergency and maintaining reservoirs is supplied through said passage and a restricted port 87 to a passage 88 which leads to brake cylinder passage 23, the object being to provide a slow build up of brake cylinder pressure after an initial inshot, as effected by apparatus, such as shown in the co-pending application of Clyde C. Farmer, Serial No. 33,152, filed May 27, 1925, and which it is not deemed necessary to explain in the present application.

Means are also provided for retarding the release of the brakes, whereby upon an increase in brake pipe pressure for releasing the brakes, the release of the brakes on the forward end of the train is retarded, by temporarily restricting the brake cylinder exhaust, so that as the wave of increased brake pipe pressure travels through the train and actuates the triple valves at the rear end of the train, a substantially simultaneous release of all the brakes will be effected.

For this purpose, the triple valve device has two release positions, a normal full release position and a retarded release position. The spring pressed stop 8 yieldingly maintains the triple valve slide valve 5 in normal release position, as shown in Fig. 1, but when the brake pipe pressure is increased to effect the release of the brakes, the rapid increase of pressure at the head end of the train will move the piston 3 and slide valve 5 to the extreme inner retarded release position, in which a restricted extension 89 of release cavity 73 limits or restricts the rate at which fluid is released from the brake cylinder, the triple valve parts remaining in the retarded release position, until the brake pipe and auxiliary reservoir pressures have substantially equalized. At the rear end of the train, where the increase in brake pipe pressure is slow, the triple valve parts will be moved only to the full release position.

With graduated release, when the brake valve device is moved from release to lap position in the usual way, there is a possibility, due to the rush of fluid from the head to the rear of the train, that the brake pipe pressure at the head end may be reduced sufficiently to shift the triple valve piston to application position and with the quick service feature present, fluid may then be vented from the brake pipe to the quick action chamber 64 so as to cause a reapplication of the brakes.

In order to prevent this, we utilize the retarded release movement of the triple valve parts, to restrict or entirely prevent the venting of fluid from the quick action chamber when the triple valve parts are in the retarded release position at the head end of the train.

Upon movement of the triple valve parts to full release position, fluid vented from the brake pipe to the chamber 64, is released by way of passage 65, cavity 66 in slide valve 5, passage 90, and restricted port 91, but in retarded release position, fluid is released from the chamber 64 by way of an additional passage 92 having a restricted port 94, which is more restricted than the port 91, and in fact, the passage 93 might in some cases be dispensed with or entirely plugged, so that in the retarded release position, fluid would not be vented from the chamber 64.

With the above arrangement, if a graduated release is effected, the release of fluid from the chamber 64, which was vented thereto in making the previous brake application, will only be vented, if at all, at a very slow rate at the head end of the train, when the triple valve moves to retarded release position, so that if a triple valve at the head end should move to application position, due to the rush of fluid toward the rear of the train, there will be substantially no venting of fluid from the brake pipe to the chamber 64.

In some cases, it may be desired to charge the emergency reservoir 20 from the auxiliary reservoir 28 instead of from the maintaining reservoir 37, and for this purpose a changeover cap 95 is provided which in one position, as shown in Fig. 1, connects passage 38 through a cavity 96 with passage 61, so that the source of supply for the charging device is the maintaining reservoir 37. In the other position of the cap 95, as shown in Fig. 3, passage 61 is connected, through a cavity 97, with passage 36, so that the auxiliary reservoir 28 is then connected to the charging device.

Having now described our invention, what we claim as new and desire to secure by Letters Patent, is:—

1. The combination with a brake cylinder and an auxiliary reservoir, of a brake cylinder pressure maintaining valve means operated according to variations in pressure in the auxiliary reservoir and the brake cylinder for controlling the supply of fluid under pressure to the brake cylinder.

2. The combination with a brake cylinder and an auxiliary reservoir, of a brake cylinder pressure maintaining valve means operated according to variations in pressure in the auxiliary reservoir and the brake cylinder for controlling the supply and exhaust of fluid under pressure to and from the brake cylinder.

3. The combination with a brake cylinder and an auxiliary reservoir, of a brake cylinder pressure maintaining valve device comprising a valve for controlling the supply of fluid under pressure to the brake cylinder, and movable abutments subject to variations in pressure in the brake cylinder and the auxiliary reservoir for operating said valve.

4. The combination with a brake cylinder and an auxiliary reservoir, of a brake cylinder pressure maintaining valve device comprising a valve for controlling the supply of fluid under pressure to the brake cylinder, and movable abutments subject to variations in pressure in the brake cylinder and the auxiliary reservoir, and to a constant pressure for operating said valve.

5. The combination with a brake cylinder and a brake pipe, of a valve mechanism for maintaining the pressure in the brake cylinder against leakage, a valve device operated upon a reduction in brake pipe pressure for supplying fluid under pressure to the brake cylinder to apply the brakes, and means for preventing the functioning of said valve mechanism except upon movement of said valve device to application position.

6. The combination with a brake cylinder and a brake pipe, of a valve mechanism for controlling the graduated release of the brakes and the maintaining of brake cylinder pressure against leakage, a valve device operated upon a reduction in brake pipe pressure for supplying fluid to the brake cylinder, a valve operable to prevent the functioning of said valve mechanism to graduate the release of the brakes and also to prevent the functioning of said valve mechanism to maintain the brake cylinder pressure except upon movement of said valve device to supply fluid to the brake cylinder.

7. The combination with a brake cylinder and brake pipe, of a source of fluid under pressure, a valve device operated upon a reduction in brake pipe pressure for supplying fluid under pressure to the brake cylinder, a valve mechanism operating upon a deficiency in brake cylinder pressure for supplying fluid from said source to the brake cylinder, a manually operable valve having a position for establishing communication from said source to said valve mechanism and another position in which said source is connected to said valve mechanism through passages controlled by said valve device.

8. The combination with a brake cylinder and brake pipe, of a source of fluid under pressure, a valve device operated upon a reduction in brake pipe pressure for supplying fluid under pressure to the brake cylinder, a valve mechanism operating upon a deficiency in brake cylinder pressure for supplying fluid from said source to the brake cylinder, a manually operable valve having a position for establishing communication from said source to said valve mechanism and another position in which said source is connected to said valve mechanism through passages which are open only when said valve device is moved to application position.

9. In a fluid pressure brake, the combination with a brake pipe and brake cylinder, of a valve device operated upon a reduction in brake pipe pressure for supplying fluid under pressure to the brake cylinder and having two release positions, a chamber into which fluid is vented from the brake pipe upon movement of said device to apply the brakes, fluid being released from said chamber at one rate upon movement of said valve device to one release position and at a different rate upon movement of said valve device to the other release position.

10. In a fluid pressure brake, the combination with a brake pipe and brake cylinder, of a valve device operated by variations in brake pipe pressure for controlling the admission and exhaust of fluid under pressure to and from the brake cylinder, a chamber into which fluid under pressure is vented from the brake pipe in applying the brakes to effect quick service action, said valve device having two release positions, in one of which fluid is vented from said chamber at a predetermined rate and in the other at a lesser rate.

11. In a fluid pressure brake, the combination with a brake pipe and brake cylinder, of a valve device operated by variations in brake pipe pressure for controlling the admission and exhaust of fluid under pressure to and from the brake cylinder, a chamber into which fluid under pressure is vented from the brake pipe in applying the brakes to effect quick service action, said valve device having a normal release position and an inner release position in which the release of fluid from the brake cylinder is restricted and adapted in the normal release position to vent fluid from said chamber at a predetermined rate and in the restricted release position at a lesser rate.

12. A fluid pressure brake apparatus comprising a brake pipe, brake cylinder, auxiliary reservoir, maintaining reservoir, two check valves, a triple valve device operated upon a reduction in brake pipe pressure for supplying fluid under pressure from the auxiliary reservoir to the brake cylinder, a maintaining valve device for supplying fluid under pressure from the maintaining reservoir to the brake cylinder, said maintaining reservoir being charged with fluid under pressure from the brake pipe through a port open only when the triple valve device is in release position and past said check valves.

13. A fluid pressure brake apparatus comprising a brake pipe, brake cylinder, auxiliary reservoir, maintaining reservoir, two check valves, a triple valve device operated upon a reduction in brake pipe pressure for supplying fluid under pressure from the auxiliary reservoir to the brake cylinder, a maintaining valve device for supplying fluid under pressure from the maintaining reservoir to the brake cylinder, said maintaining reservoir being charged with fluid under pressure from the brake pipe through a passage controlled by the triple valve piston and past said check valves.

14. A fluid pressure brake apparatus comprising a brake pipe, brake cylinder, auxiliary reservoir, maintaining reservoir, two check valves, a triple valve device operated upon a reduction in brake pipe pressure for supplying fluid under pressure from the auxiliary reservoir to the brake cylinder, a maintaining valve device for supplying fluid under pressure from the maintaining reservoir to the brake cylinder, said maintaining reservoir being charged with fluid under pressure from the brake pipe through a passage controlled by the triple valve piston and past said check valves and through a restricted port.

15. A fluid pressure brake apparatus comprising a brake pipe, brake cylinder, auxiliary reservoir, maintaining reservoir, two check valves, a triple valve device operated upon a reduction in brake pipe pressure for supplying fluid under pressure from the auxiliary reservoir to the brake cylinder, a maintaining valve device for supplying fluid under pressure from the maintaining reservoir to the brake cylinder, said maintaining reservoir being charged with fluid under pressure from the brake pipe through a port open to the brake pipe in release position of the triple valve device and past the check valves, said port being open to the auxiliary reservoir side of the triple valve device upon movement of same to apply the brakes.

16. A fluid pressure brake apparatus comprising a brake pipe, brake cylinder, auxiliary reservoir, maintaining reservoir, an emergency reservoir, a triple valve device operated upon a reduction in brake pipe pressure for supplying fluid under pressure from the auxiliary reservoir to the brake cylinder, a maintaining valve device subject to emergency reservoir pressure for supplying fluid under pressure from the maintaining reservoir to the brake cylinder, and a charging valve device operated by fluid under pressure from the maintaining reservoir for controlling the supply of fluid under pressure from the maintaining reservoir to the emergency reservoir.

17. A fluid pressure brake apparatus comprising a brake pipe, brake cylinder, auxiliary reservoir, maintaining reservoir, an emergency reservoir, a triple valve device operated upon a reduction brake pipe pressure for supplying fluid under pressure from the auxiliary reservoir to the brake cylinder, a maintaining valve device subject to emergency reservoir pressure for supplying fluid under pressure from the maintaining reservoir to the brake cylinder, means for charging the maintaining reservoir from the brake pipe, and means for charging the emergency reservoir from the maintaining reservoir.

18. A fluid pressure brake apparatus comprising a brake pipe, brake cylinder, auxiliary reservoir, maintaining reservoir, an emergency reservoir, a triple valve device operated upon a reduction in brake pipe pressure for supplying fluid under pressure from the auxiliary reservoir to the brake cylinder, a maintaining valve device subject to emergency reservoir pressure for supplying fluid under pressure from the maintaining reservoir to the brake cylinder, means for charging the maintaining reservoir from the brake pipe, and a charging valve device operated by fluid under pressure from the maintaining reservoir for controlling the supply of fluid under pressure from the maintaining reservoir to the emergency reservoir.

19. A fluid pressure brake apparatus comprising a brake pipe, brake cylinder, auxiliary reservoir, maintaining reservoir, an emergency reservoir, a triple valve device operated upon a reduction in brake pipe pressure for supplying fluid under pressure from the auxiliary reservoir to the brake cylinder, a maintaining valve device subject to emergency reservoir pressure for supplying fluid under pressure from the maintaining reservoir to the brake cylinder, and means for connecting the maintaining reservoir and the emergency reservoir to the auxiliary reservoir in an emergency application of the brakes, whereby fluid is supplied from all reservoirs to the brake cylinder in an emergency application of the brakes.

20. A fluid pressure brake apparatus comprising a brake pipe, brake cylinder, auxiliary reservoir, maintaining reservoir, an emergency reservoir, a triple valve device operated upon a reduction in brake pipe pressure for supplying fluid under pressure from the auxiliary reservoir to the brake cylinder, a maintaining valve device subject to emergency reservoir pressure for supplying fluid under pressure from the maintaining reservoir to the brake cylinder, and a valve device operated upon movement of the triple valve device to effect an emergency application of the brakes for connecting the maintaining reservoir and the emergency reservoir to the auxiliary reservoir, so that fluid from the three reservoirs is supplied to the brake cylinder in an emergency application of the brakes.

21. In a fluid pressure brake, the combination with a brake pipe and a triple valve device having means for venting the brake pipe in service application position, of means operating upon an excessive rise in brake pipe pressure in releasing the brakes for preventing or reducing the venting of the brake pipe in an ensuing service application of the brakes.

22. In a fluid pressure brake, the combination with a brake pipe and a triple valve device having means for venting the brake pipe in service application position, of means operating upon an excessive rise in brake pipe pressure in releasing the brakes for reducing the venting of the brake pipe in an ensuing service application of the brakes.

In testimony whereof we have hereunto set our hands.

CLYDE C. FARMER.
THOMAS H. THOMAS.